United States Patent
Wang et al.

(10) Patent No.: US 12,063,069 B2
(45) Date of Patent: Aug. 13, 2024

(54) INTEGRATED APPARATUS FOR LIGHT DETECTION, ILLUMINATION AND COMMUNICATION, AND METHOD FOR CONTROLLING SAME

(71) Applicant: SUZHOU LIANGXIN OPTOELECTRIC TECHNOLOGY CO., LTD, Suzhou (CN)

(72) Inventors: Yongjin Wang, Suzhou (CN); Kang Fu, Suzhou (CN)

(73) Assignee: SUZHOU LIANGXIN OPTOELECTRIC TECHNOLOGY CO., LTD., Jiangsu (CN)

( * ) Notice: Subject to any disclaimer, the term of this patent is extended or adjusted under 35 U.S.C. 154(b) by 78 days.

(21) Appl. No.: 17/833,616

(22) Filed: Jun. 6, 2022

(65) Prior Publication Data

US 2022/0303006 A1    Sep. 22, 2022

Related U.S. Application Data

(63) Continuation of application No. PCT/CN2020/128346, filed on Nov. 12, 2020.

(51) Int. Cl.
*H04B 10/116* (2013.01)
*H04L 9/40* (2022.01)
*H05B 47/195* (2020.01)

(52) U.S. Cl.
CPC .......... *H04B 10/116* (2013.01); *H04L 63/083* (2013.01); *H05B 47/195* (2020.01)

(58) Field of Classification Search
None
See application file for complete search history.

(56) References Cited

U.S. PATENT DOCUMENTS

| 5,786,921 A | * | 7/1998 | Wang | H04B 10/40 398/41 |
| 6,154,298 A | * | 11/2000 | Tamagawa | H04B 10/11 398/1 |

(Continued)

FOREIGN PATENT DOCUMENTS

| CN | 107548216 A | 1/2018 |
| CN | 109448188 A | 3/2019 |

(Continued)

OTHER PUBLICATIONS

International Search Report of International Application No. PCT/CN2020/128346 dated Feb. 2, 2021 with English translation, (4p).

*Primary Examiner* — Jai M Lee
(74) *Attorney, Agent, or Firm* — Arch & Lake LLP

(57) ABSTRACT

Apparatuses and methods are provided for light detection, illumination and communication. The apparatus may include: a detector, including a light source, and configured to receive a first visible light signal carrying first password information from the outside in response to the light source being in an off state, and receive a second visible light signal carrying second password information from the outside in response to the light source being in an on state; a processor, configured to determine whether the first password information matches an enable password, and control the light source to be turned on in response to determining that the first password information matches the enable password; and the processor is further configured to determine whether the second password information matches a disable password, and control the light source to be turned off in response to determining that the second password information matches the disable password.

8 Claims, 3 Drawing Sheets

(56) References Cited

U.S. PATENT DOCUMENTS

| | | | | |
|---|---|---|---|---|
| 6,188,496 | B1* | 2/2001 | Krishna | H04B 10/1149 |
| | | | | 398/115 |
| 8,332,139 | B2* | 12/2012 | Bae | H04B 10/1149 |
| | | | | 701/532 |
| 9,264,138 | B2* | 2/2016 | Schmid | H04L 7/04 |
| 10,523,319 | B2* | 12/2019 | Afgani | H04B 10/116 |
| 11,239,915 | B2* | 2/2022 | Burchardt | H04B 10/116 |
| 2006/0214815 | A1* | 9/2006 | Komatsu | H04M 1/737 |
| | | | | 340/956 |
| 2009/0049532 | A1* | 2/2009 | Gao | H04B 10/272 |
| | | | | 726/5 |
| 2012/0321321 | A1* | 12/2012 | Riesebosch | H04B 10/116 |
| | | | | 398/118 |
| 2020/0187336 | A1* | 6/2020 | Verberkt | F24F 11/30 |
| 2020/0274615 | A1* | 8/2020 | Yamada | H04W 16/28 |
| 2021/0223881 | A1* | 7/2021 | Van Ostrand | G09G 3/3225 |
| 2023/0044169 | A1* | 2/2023 | Wang | H05B 47/115 |

FOREIGN PATENT DOCUMENTS

| | | | | |
|---|---|---|---|---|
| CN | 111092654 | A | 5/2020 | |
| CN | 109448188 | B * | 4/2021 | G07C 9/00944 |

* cited by examiner

INTEGRATED APPARATUS FOR LIGHT DETECTION, ILLUMINATION AND COMMUNICATION, AND METHOD FOR CONTROLLING SAME

CROSS-REFERENCE TO RELATED APPLICATIONS

This application is a continuation application of PCT application No. PCT/CN2020/128346 filed on Nov. 12, 2020, which claims priority to Chinese Patent Application No. CN201911233909.0 filed on Dec. 5, 2019, the entire disclosures thereof are incorporated herein by reference for all purposes.

TECHNICAL FIELD

The present disclosure relates to the field of illumination, display and optical communication, and in particular, relates to an integrated apparatus for light detection, illumination and communication, and a method controlling thereof.

BACKGROUND

Visible light communication (VLC) is a novel, short-range and high-speed wireless communication technology developed based on light-emitting diode (LED) and the like technologies. In the VLC, an LED is used as a light source, atmosphere or water is used as a propagation medium, information is transmitted by emitting visible light signals that are invisible to naked eyes and flicker at a high speed, and the visible light signals are converted at a receiver end into photoelectric signals using a photodiode (PD), and electrical signals are received, regenerated, and demodulated, such that information transmission is implemented. Compared with traditional radio frequency communication, the VLC has the advantages of low energy consumption, low cost in device purchase, and the like, conforming to the national energy-saving and emission-reduction strategies; and the VLC causes no electromagnetic pollution, no mutual interference is present between visible light wavelengths and radio frequency signals, no hazard is caused to human eyes, and spectrum may be used with no need of authorization. In addition, the VLC is suitable for use in information security fields, and as long as the visible light is blocked, information in the VLC communication network may not leak, thereby achieving a high security. In view of the above factors, the VLC is well recognized as the most promising communication technology, and has become a hot subject for researches at home and abroad.

However, a conventional VLC apparatus is limited in terms of functionality, and a physical switch needs to be configured on the VLC apparatus to control on and off of various functions of the VLC apparatus. In this way, in one aspect, concealment of the VLC is reduced, and in another aspect, smartness of the VLC communication is hindered.

Therefore, how to improve the conventional VLC apparatus and expand functions of the VLC apparatus is a technical problem to be urgently addressed.

SUMMARY

The present disclosure provides an integrated apparatus for light detection, illumination and communication, and a method for controlling the same, to solve the problem in the related art that functionality of a visible light communication apparatus is single, and smartness of the VLC is poor, and to expand application fields of the VLC.

To solve the above technical problem, the present disclosure provides an integrated apparatus for light detection, illumination and communication. The apparatus includes: a detector, a processor, and a transmitter. The detector includes a light source, and configured to receive a first visible light signal from the outside in response to the light source being in an off state, the first visible light signal carrying first password information. The processor is connected to the detector, and configured to determine whether the first password information matches an enable password, and control the light source to be turned on to emit a second visible light signal to the outside in response to determining that the first password information matches the enable password. The transmitter is connected to the processor, and configured to determine whether multimedia information is received from the outside, and load the multimedia information to the second visible light signal in response to determining that the multimedia information is received. The detector is further configured to receive a third visible light signal from the outside in response to the light source being in an on state, the third visible light signal carrying second password information; and the processor is further configured to determine whether the second password information matches a disable password, and control the light source to be turned off in response to determining that the second password information matches the disable password.

DETAILED DESCRIPTION

Hereinafter, specific embodiments of an integrated apparatus for light detection, illumination and communication and a method for controlling the same according to the present disclosure are described in detail with reference to the accompanying drawings.

Figure 1:
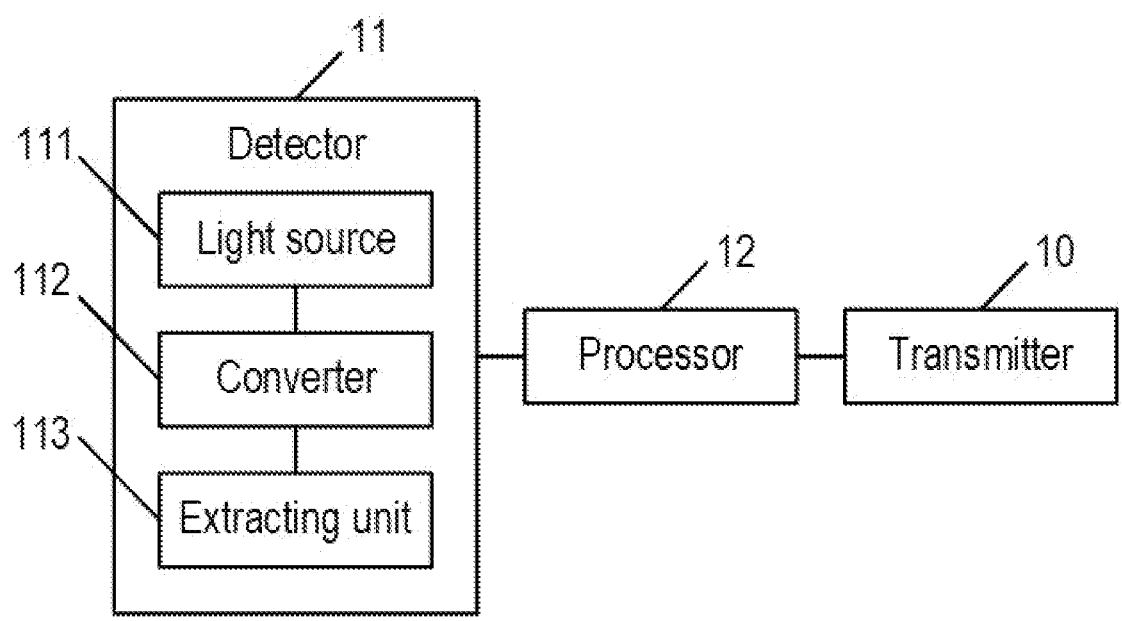
FIG. 1 is a structural block diagram of an integrated apparatus for light detection, illumination and communication according to a specific embodiment of the present disclosure.
Figure 2:
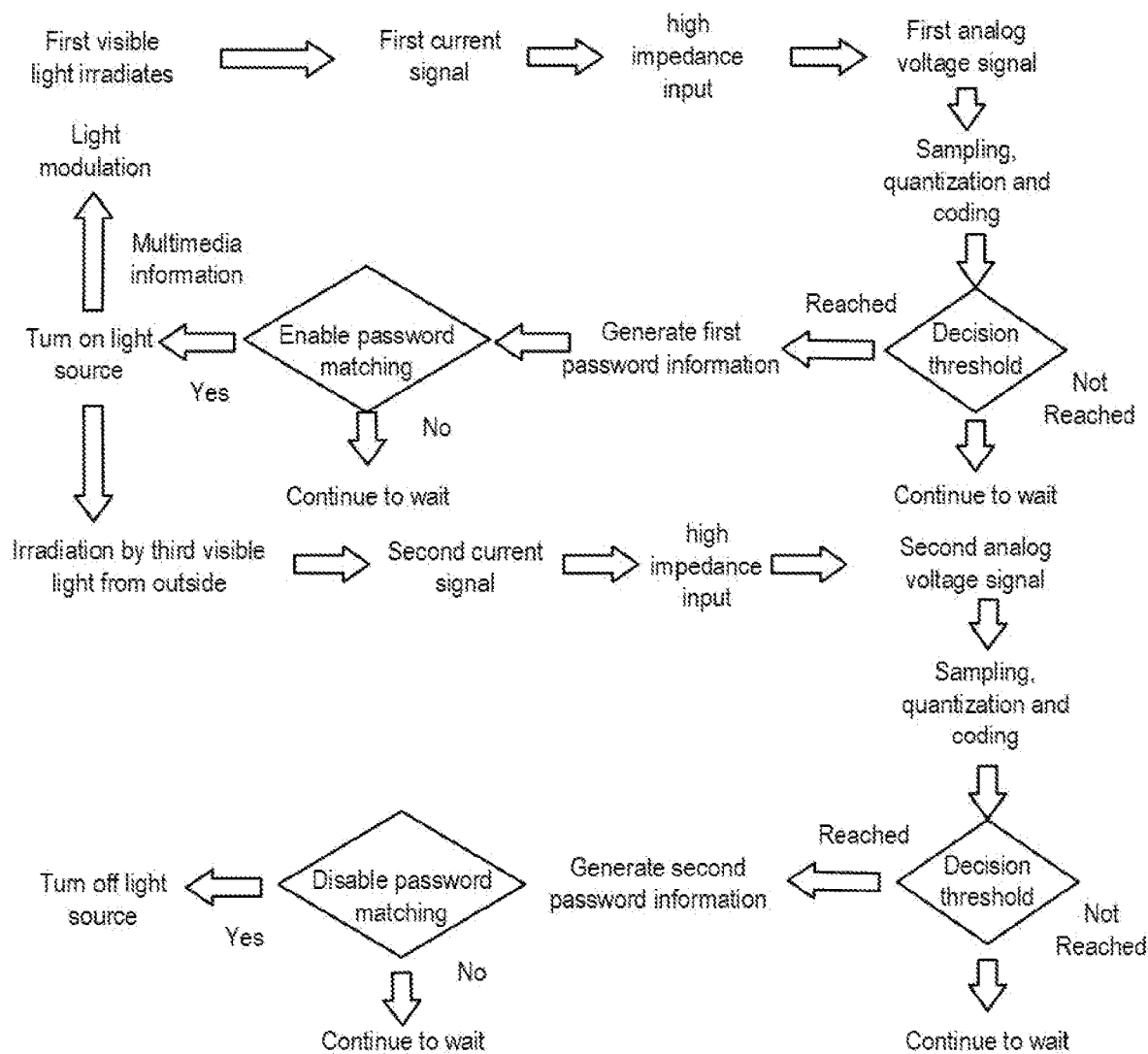
FIG. 2 is a schematic logical diagram of operation of an integrated apparatus for light detection, illumination and communication according to a specific embodiment of the present disclosure.

Some specific embodiments of the present disclosure provide an integrated apparatus for light detection, illumination and communication. FIG. 1 is a structural block diagram of an integrated apparatus for light detection, illumination and communication according to a specific embodiment of the present disclosure. FIG. 2 is a schematic logical diagram of operation of an integrated apparatus for light detection, illumination and communication according to a specific embodiment of the present disclosure. As illustrated in FIG. 1 and FIG. 2, the integrated apparatus for light detection, illumination and communication according to this embodiment includes:

a detector 11, including a light source 111, and configured to receive a first visible light signal from the outside in response to the light source 111 being in an off state, the first visible light signal carrying first password information;

a processor 12, connected to the detector 11, and configured to determine whether the first password information matches an enable password, and control the light source to be turned on to emit a second visible light signal to the outside in response to determining that the first password information matches the enable password; and a transmitter 10, connected to the processor 12, and configured to determine whether multimedia information is received from the outside, and load the multimedia information to the second visible light signal in response to determining that the multimedia information is received;

wherein the detector 11 is further configured to receive a third visible light signal from the outside in response to the light source 111 being in an on state, the third visible light signal carrying second password information; and the processor 12 is further configured to determine whether the second password information matches a disable password, and control the light source 111 to be turned off in response to determining that the second password information matches the disable password.

Specifically, the integrated apparatus for light detection, illumination and communication includes the transmitter 10, the detector 11, and the processor 12. When the light source 111 is in the off state, the light source 111 does not provide illumination. However, the light source 111 may constantly detect an external optical signal. When the external terminal (for example, a flashlight of a mobile phone, a laser pen, or the like) emits the first visible light signal to the integrated apparatus for light detection, illumination and communication, the light source 111 receives the first visible light signal, and the detector 11 extracts the first password information carried in the first visible light signal. The processor 12 compares the first password information extracted by the detector 11 with an enable password pre-stored in the integrated apparatus for light detection, illumination and communication. In the case that the first password information matches the enable password, the integrated apparatus for light detection, illumination and communication receives an instruction for enabling the light source 111, and the processor 12 drives the light source 111 to emit light, that is, controlling the light source 111 to change from the off state (that is, a turned-off state) to the on state (that is, a turned-on state). After the light source 111 is turned on, the second visible light signal may be emitted to the outside, that is, an illumination function of the light source 111 is implemented.

To be specific, in the case that the processor 12 drives the light source 111 to enable the illumination function, the light source 111 is in a constant illumination state; and in the case that the transmitter 10 receives multimedia information from the outside, for example, a multimedia playback device (for example, an audio player) outside the transmitter 10, the multimedia playback device sends the multimedia information to the transmitter 10 in the form of electric signals. The transmitter 10 loads the multimedia information to the light source 111, and modulates the second visible light signal carrying the multimedia information sent by the light source 111. An external photoelectric receiving device receives the second visible light signal carrying the multimedia information, and achieves visible light communication of the information by means of photoelectric conversion. In the case that the transmitter 10 does not receive the multimedia information from the outside, the light source 111 maintains the illumination state, that is, constantly emitting the second visible light signal not carrying the multimedia information.

To be specific, in the case that the transmitter 10 completes transfer of the multimedia information, the light source 111 maintains a state of illumination and detection. In the case that the light source 111 detects the third visible light signal and the detector 11 extracts the second password information carried in the third visible light signal, when the processor 12 determines that the second password information matches a disable password pre-stored in the integrated apparatus for light detection, illumination and communication, the light source 111 is controlled to turn off illumination and visible light emission functions, that is, controlling the light source 111 to change from the on-state (that is, turned on) to the off-state (that is, turned off).

In this specific embodiment, the multimedia information may include video information, audio information, or text information.

Optionally, the light source 111 is configured to receive the first visible light signal from the outside, and convert the first visible light signal to a first current signal; and the detector 11 further includes:

a converter 112, configured to convert the first current signal to a first analog voltage signal; and an extracting unit 113, configured to perform sampling, quantization and coding on the first analog voltage signal, and generate the first password information in response to a decision threshold being reached.

To be specific, as illustrated in FIG. 2, in the case that the first visible light irradiates the integrated apparatus for light detection, illumination and communication, the light source 111 receives the first visible light signal, and spontaneously generates the first current signal. Due to an internal impedance of the light source 111 and a high impedance of a drive port of the light source, the converter 112 generates the first analog voltage signal from the first current signal. The extracting unit 113 performs sampling, quantization and coding on the first analog voltage signal, and generates the first password information in response to the decision threshold being reached. Where the decision threshold fails to be reached upon sampling, quantization and coding, the light source waits for input of other optical signals. For example, the sampling, quantization and coding means that the detector 11 acquires a specific voltage value by subjecting the first analog voltage signal acquired by an analog input port to 256-level quantization inside the detector 11, and then coding is performed. This is equivalent to an AD (analog-to-digital) conversion process. Determining whether the decision threshold is reached is determining a level of a numerical voltage acquired upon coding.

Optionally, the light source 111 includes a quantum-well light-emitting diode device. Since the quantum well diode device has characteristics of light emission and light detection, applying the quantum well diode device as the light source facilitates simplification of the structure of the integrated apparatus for light detection, illumination and communication, and reduces manufacture cost of the integrated apparatus for light detection, illumination and communication.

Figure 3:
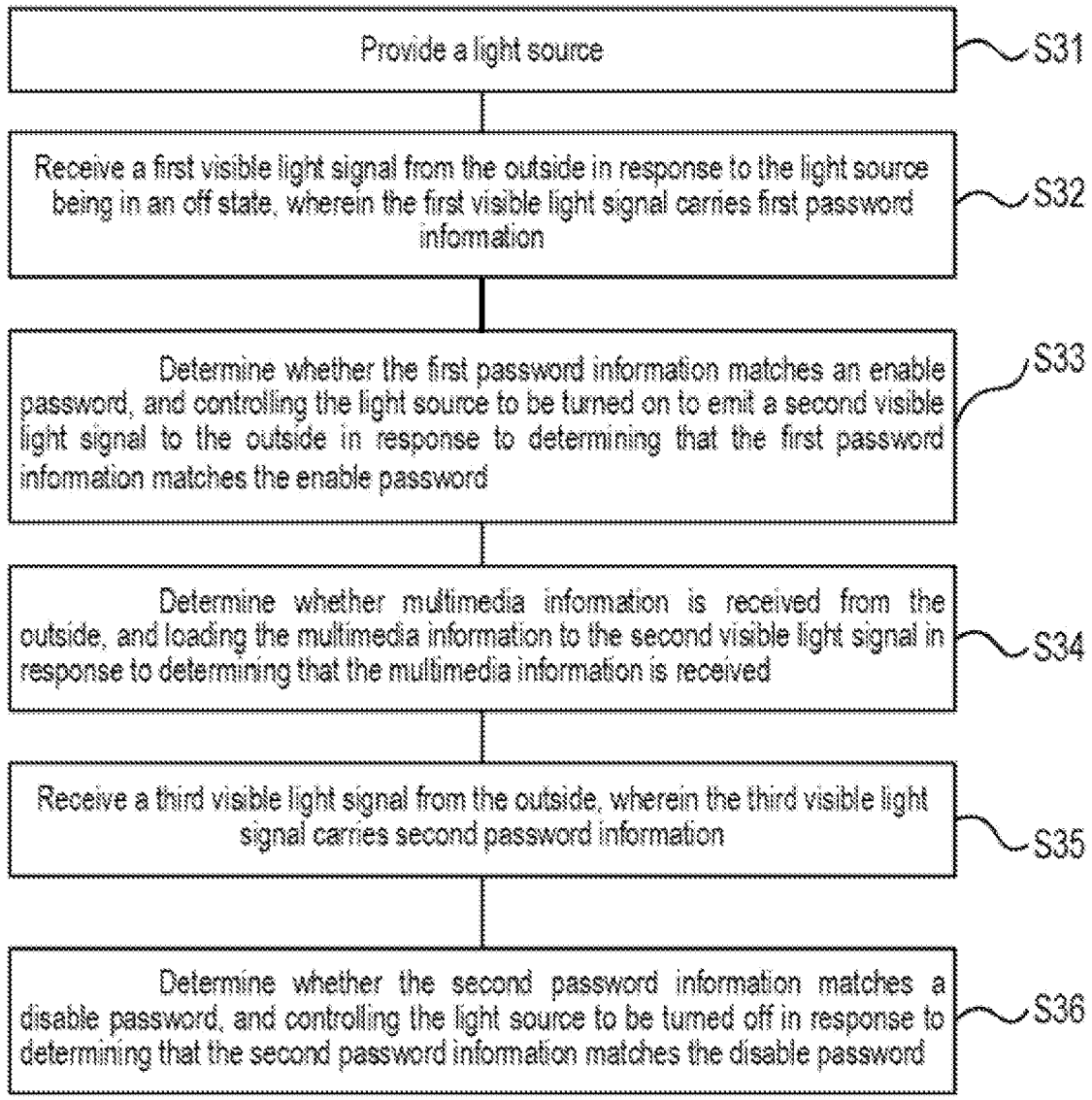
FIG. 3 is a flowchart of a method for controlling an integrated apparatus for light detection, illumination and communication according to a specific embodiment of the present disclosure.

Further, some specific embodiments of the present disclosure further provide a method for controlling an integrated apparatus for light detection, illumination and communication. FIG. 3 is a schematic flowchart of a method for controlling an integrated apparatus for light detection, illumination and communication according to a specific embodiment. For the structure of the integrated apparatus for light detection, illumination and communication according to the specific embodiment of the present disclosure, reference may be made to FIG. 1 and FIG. 2. As illustrated in FIG. 1 to FIG. 3, the method for controlling the integrated apparatus for light detection, illumination and communication includes:

step S31: providing a light source 111;

step S32: receiving a first visible light signal from the outside in response to the light source 111 being in an off state, wherein the first visible light signal carries first password information;

step S33: determining whether the first password information matches an enable password, and controlling the light source 111 to be turned on to emit a second visible light signal to the outside in response to determining that the first password information matches the enable password;

step S34: determining whether multimedia information is received from the outside, and loading the multimedia information to the second visible light signal in response to determining that the multimedia information is received;

step S35: receiving a third visible light signal from the outside, wherein the third visible light signal carries second password information; and step S36: determining whether the second password information matches a disable password, and controlling the light source to be turned off in response to determining that the second password information matches the disable password.

Optionally, the multimedia information may include video information, audio information, or text information.

Optionally, receiving the first visible light signal from the outside in response to the light source 111 being in the off state includes:

receiving the first visible light signal from the outside, and converting the first visible light signal to a first current signal;

converting the first current signal to a first analog voltage signal; and performing sampling, quantization and coding on the first analog voltage signal, and generating the first password information in response to a decision threshold being reached.

Optionally, upon controlling the light source 111 to be turned on, the method further includes:

receiving a third visible light signal from the outside, wherein the third visible light signal carries second password information; and determining whether the second password information matches a disable password, and controlling the light source 111 to be turned off in response to determining that the first password information matches the disable password.

Optionally, the light source 111 includes a quantum-well light-emitting diode device.

In the integrated apparatus for light detection, illumination and communication, and the method for controlling the same according to the specific embodiments of the present disclosure, the state of the light source is controlled by a second optical signal emitted by an external terminal, that is, by an optical password, with no need of disposing a separate physical switch on the integrated apparatus for light detection, illumination and communication to turn on or turn off the light source. In this way, in one aspect, concealment of application of the integrated apparatus for light detection, illumination and communication is improved; and in another aspect, smartness of the integrated apparatus for light detection, illumination and communication is enhanced, and application of the integrated apparatus for light detection, illumination and communication in such fields as illumination, display and optical communication is expanded.

Optionally, the multimedia information includes video information, audio information, or text information.

Optionally, the light source is configured to receive the first visible light signal from the outside, and convert the first visible light signal to a first current signal; and the detecting module further includes:

a converting unit, configured to convert the first current signal to a first analog voltage signal; and an extracting unit, configured to perform sampling, quantization and coding on the first analog voltage signal, and generate the first password information in response to a decision threshold being reached.

Optionally, the light source includes a quantum-well light-emitting diode device.

To solve the above technical problem, the present disclosure further provides a method for controlling an integrated apparatus for light detection, illumination and communication. The method includes:

providing a light source;

receiving a first visible light signal from the outside in response to the light source being in an off state, wherein the first visible light signal carries first password information;

determining whether the first password information matches an enable password, and controlling the light source to be turned on to emit a second visible light signal to the outside in response to determining that the first password information matches the enable password;

determining whether multimedia information is received from the outside, and loading the multimedia information to the second visible light signal in response to determining that the multimedia information is received;

receiving a third visible light signal from the outside, wherein the third visible light signal carries second password information; and determining whether the second password information matches a disable password, and controlling the light source to be turned off in response to determining that the second password information matches the disable password.

Optionally, the multimedia information includes video information, audio information, or text information.

Optionally, receiving the first visible light signal from the outside in response to the light source being in the off state includes:

receiving the first visible light signal from the outside, and converting the first visible light signal to a first current signal;

converting the first current signal to a first analog voltage signal; and performing sampling, quantization and coding on the first analog voltage signal, and generating the first password information in response to a decision threshold being reached.

Optionally, the light source includes a quantum-well light-emitting diode device.

In the integrated apparatus for light detection, illumination and communication, and the method for controlling the same according to the present disclosure, the state of the light source is controlled by a second optical signal emitted by an external terminal, that is, by an optical password, with no need of disposing a separate physical switch on the integrated apparatus for light detection, illumination and communication to turn on or turn off the light source. In this way, in one aspect, concealment of application of the integrated apparatus for light detection, illumination and communication is improved; and in another aspect, smartness of the integrated apparatus for light detection, illumination and communication is enhanced, and application of the integrated apparatus for light detection, illumination and communication in such fields as illumination, display and optical communication is expanded.

Described above are preferred examples of the present disclosure. It should be noted that persons of ordinary skill in the art may derive other improvements or polishments without departing from the principles of the present disclosure. Such improvements and polishments shall be deemed as falling within the protection scope of the present disclosure.

What is claimed is:

1. An integrated apparatus for light detection, illumination and communication, comprising:
    a detector, comprising a light source, and configured to receive a first visible light signal from the outside in response to the light source being in an off state, and extract first password information carried in the first visible light signal, wherein the light source does not provide illumination in the off state;
    a processor, connected to the detector, and configured to determine whether the first password information matches an enable password, and control the light source to be turned on to emit a second visible light signal to the outside in response to determining that the first password information matches the enable password; and
    a transmitter, connected to the processor, and configured to determine whether multimedia information is received from the outside, and load the multimedia information to the second visible light signal in response to determining that the multimedia information is received;
    wherein the detector is further configured to receive, by reverse biasing the light source, a third visible light signal from the outside, the third visible light signal carrying second password information; and the processor is further configured to determine whether the second password information matches a disable password, and control the light source to be turned off in response to determining that the second password information matches the disable password.

2. The integrated apparatus for light detection, illumination and communication according to claim 1, wherein the multimedia information comprises video information, audio information, or text information.

3. The integrated apparatus for light detection, illumination and communication according to claim 1, wherein the light source is configured to receive the first visible light signal from the outside, and convert the first visible light signal to a first current signal; and the detector further comprises:

a converter, configured to convert the first current signal to a first analog voltage signal; and
    an extracting unit, configured to perform sampling, quantization and coding on the first analog voltage signal, and generate the first password information in response to a decision threshold being reached.

4. The integrated apparatus for light detection, illumination and communication according to claim 1, wherein the light source comprises a quantum-well light-emitting diode device.

5. A method for controlling an integrated apparatus for light detection, illumination and communication, comprising:
    providing a light source;
    receiving a first visible light signal from outside in response to the light source being in an off state, wherein the first visible light signal carries first password information, wherein the light source does not provide illumination in the off state;
    determining whether the first password information matches an enable password, and controlling the light source to be turned on to emit a second visible light signal to the outside in response to determining that the first password information matches the enable password;
    determining whether multimedia information is received from the outside, and loading the multimedia information to the second visible light signal in response to determining that the multimedia information is received;
    receiving, by reverse biasing the light source, a third visible signal from the outside, wherein the third visible light signal carries second password information; and
    determining whether the second password information matches a disable password, and controlling the light source to be turned off in response to determining that the second password information matches the disable password.

6. The method according to claim 5, wherein the multimedia information comprises video information, audio information, or text information.

7. The method according to claim 5, wherein receiving the first visible light signal from the outside in response to the light source being in the off state comprises:
    receiving the first visible light signal from the outside, and converting the first visible light signal to a first current signal;
    converting the first current signal to a first analog voltage signal; and
    performing sampling, quantization and coding on the first analog voltage signal, and generating the first password information in response to a decision threshold being reached.

8. The method according to claim 5, wherein the light source comprises a quantum-well light-emitting diode device.

* * * * *